(12) United States Patent
Boscari et al.

(10) Patent No.: US 12,459,748 B2
(45) Date of Patent: Nov. 4, 2025

(54) ROTATING DEVICE FOR MOVING CONTAINERS FOR PHARMACEUTICAL USE

(71) Applicant: STEVANATO GROUP S.P.A., Piombino Dese (IT)

(72) Inventors: Daniele Boscari, Cittadella (IT); Massimo Huang, Padua (IT); Giacomo Biondi, Casirate d'Adda (IT); Paolo Pochetti, Borghetto Lodigiano (IT); Gianbattista Giussani, Treviglio (IT)

(73) Assignee: STEVANATO GROUP S.P.A., Piombino Dese (IT)

( * ) Notice: Subject to any disclaimer, the term of this patent is extended or adjusted under 35 U.S.C. 154(b) by 0 days.

(21) Appl. No.: 19/025,390

(22) Filed: Jan. 16, 2025

(65) Prior Publication Data
US 2025/0236468 A1    Jul. 24, 2025

(30) Foreign Application Priority Data

Jan. 18, 2024    (IT) .................. 102024000000849

(51) Int. Cl.
| | |
|---|---|
| *B65G 29/00* | (2006.01) |
| *B65G 47/84* | (2006.01) |
| *B65G 47/86* | (2006.01) |

(52) U.S. Cl.
CPC .......... *B65G 29/00* (2013.01); *B65G 47/847* (2013.01); *B65G 47/846* (2013.01);
(Continued)

(58) Field of Classification Search
CPC .... B65G 47/846; B65G 47/847; B65G 29/00; B65G 2201/0217; B65G 2201/0235; B65G 2812/14
(Continued)

(56) References Cited

U.S. PATENT DOCUMENTS

| | | | | |
|---|---|---|---|---|
| 2013/0068589 A1* | 3/2013 | Overley | ................. | B65G 29/00 198/612 |
| 2013/0146421 A1* | 6/2013 | Zoni | ...................... | B65G 29/00 198/608 |
| 2023/0192419 A1* | 6/2023 | Biondi | .................. | B65B 65/006 198/459.2 |

FOREIGN PATENT DOCUMENTS

| | | |
|---|---|---|
| CN | 219362480 U | 7/2023 |
| DE | 29913208 U1 | 11/1999 |
| EP | 1447327 A2 | 8/2004 |

OTHER PUBLICATIONS

Italian Search Report Jul. 15, 2024 for Italian Application No. 202400000849.
(Continued)

*Primary Examiner* — James R Bidwell
(74) *Attorney, Agent, or Firm* — Husch Blackwell LLP

(57) ABSTRACT

A rotating device for moving containers for pharmaceutical use includes a rotation group configured to be controlled in rotation about a vertical rotation axis and a plurality of gripping groups associated with the rotation group and arranged about the vertical rotation axis. Each gripping group is configured to support at least one of the containers and is rotatable about a respective horizontal rotation axis. At least some first gripping groups are movable between a first operating position in which each first gripping group is in a position proximal to the rotation group and a second operating position in which said first gripping group is in a distal position from the rotation group.

17 Claims, 5 Drawing Sheets

(52) U.S. Cl.
CPC ............... *B65G 2201/0217* (2013.01); *B65G 2201/0235* (2013.01); *B65G 2812/14* (2013.01)

(58) Field of Classification Search
USPC ..................................................... 198/478.1
See application file for complete search history.

(56) References Cited

OTHER PUBLICATIONS

Extended European Search Report issued on Jun. 12, 2025 in European Application No. 25152077.1.

* cited by examiner

ROTATING DEVICE FOR MOVING CONTAINERS FOR PHARMACEUTICAL USE

CROSS REFERENCES

The present application claims priority to Italian Application No. 102024000000849 filed on Jan. 18, 2024, the entire disclosure of which is hereby expressly incorporated by reference herein.

TECHNICAL FIELD

The present disclosure relates to a rotating device for moving containers for pharmaceutical use.

BACKGROUND

Although explicit reference will be made in this description and in the subsequent claims to containers for pharmaceutical use, the rotating device of the present disclosure is also suitable for moving containers for medical, cosmetic and/or veterinary use.

For ease of description, in the present description all the containers which can be moved by the rotating device of the present disclosure are also referred to as "primary containers".

Non-limiting examples of primary containers are vials, ampoules, carpules and syringes.

In the present description, specific reference will be made, as a non-limiting example of primary containers, to syringes.

As known, in processes for producing pre-filled ready-for-use syringes, after the syringes have been filled with a respective drug or medicament and before being packaged, they are generally subjected to various non-invasive checks, in particular of the optical type, in order to ascertain the quality and/or condition of the drug or medicament contained therein.

At least some of these controls are performed as the syringes advance along the packaging line, and require the syringes to be arranged in a vertical position (i.e. with their longitudinal axis perpendicular to the advancement direction) and to pass in front of an optical control device either in a first orientation in which the syringe plunger is placed above the end of the syringe on which the needle is to be mounted, and in a second orientation, in which the syringe plunger is placed below the end of the syringe on which the needle is to be mounted.

Each syringe must thus be moved so as to rotate by 180° about a rotation axis perpendicular to the syringe longitudinal axis.

Devices configured to perform such rotation of 180° are known. Some of these devices, hereinafter referred to as "rotating devices", comprise carousels or drums rotatable about a rotation axis.

The Applicant focused its attention on rotating devices, which in the Applicant's opinion are the most suitable to ensure an optimal compromise between high production capacity and small footprint in plan.

DE 29913208U1 discloses a carousel comprising a circular support base, rotating about a first rotation axis, and a plurality of gripping arms, mechanically connected to the outer circumferential portion of the support base. Each gripping arm rotates about a respective second rotation axis, perpendicular to the first rotation axis, and comprises a gripper for receiving and holding the syringe. A sliding profile is arranged below the support base and it is stationary with respect to the latter. The sliding profile is provided with a cam and each gripping arm is provided with rollers. Each roller slides along the cam moving a respective driving shaft along a direction parallel to the first rotation axis. Specifically, the driving shaft moves upwards and downwards depending on the position of the roller along the cam, controlling in rotation the respective gripping arm by a gear mechanism.

CN 219362480U discloses a carousel comprising a rotating drum fitted on a static gear and a plurality of gripping arms which are rotatably connected to the rotating drum. A suction cup is arranged at the end of each gripping arm. The suction cap is provided to pick up an object, e.g. a syringe, by a vacuum line running through the gripping arm and the rotating drum. The carousel is provided with a plurality of primary gears engaged with the static gear and a plurality of secondary gears, wherein each secondary gear is engaged with a corresponding primary gear and a respective gripping arm. The rotation of the rotating drum causes a rotation of the primary gears and consequently of the secondary gears, which in turn control the gripping arms in rotation.

The Applicant observed that a high number of gripping arms should be provided to ensure a high production capacity, such as in the carousel disclosed in DE 29913208U1.

However, the Applicant found that the provision of a large number of gripping arms can lead to undesirable mutual interference between syringes associated with adjacent gripping arms during the 180° rotation of syringes when these syringes are longer than a certain value. It would then be necessary to reduce the number of syringes processed by the carousel, with a consequent reduction in the production capacity.

The technical problem at the basis of the present disclosure is to provide a rotating device that ensures a high production capacity regardless of the length of the syringes being processed.

SUMMARY

The present disclosure therefore relates to a rotating device for moving containers for pharmaceutical use that includes:
  a rotation group configured to be controlled in rotation about a vertical rotation axis;
  a plurality of gripping groups associated with said rotation group and arranged about said vertical rotation axis, each gripping group being configured to support at least one of said containers and being rotatable about a respective horizontal rotation axis;
  wherein at least some first gripping groups of said plurality of gripping groups are movable between a first operating position in which each first gripping group is in a position proximal to said rotation group and a second operating position in which said first gripping group is in a position distal from said rotation group.

The provision of first gripping groups that can be moved away from the rotating group allows the respective containers to be rotated after having been moved away from the containers supported by the adjacent gripping groups, thus avoiding the risk of mutual interference between adjacent containers while they rotate by 180°. It is thus possible to ensure a high production capacity even in the case of very long containers.

The present disclosure may have at least one of the preferred features described below, wherein each of these features may be provided individually or in combination with the other preferred features.

Preferably, said gripping groups are arranged about said vertical rotation axis along respective radial directions. In this way the spacing between circumferentially adjacent gripping groups is maximised while minimising the plan dimensions. This expedient also allows a smooth automated transfer of the containers to/from the gripping groups before and after their 180° rotation.

In the description and in the appended claims, the terms "radial" and the like are used to refer to any direction perpendicular to the aforementioned vertical rotation axis, the terms "axial" and the like are used to refer to any direction coincident with or parallel to the aforementioned vertical rotation axis, and the terms "circumferential" and the like are used to refer to any direction rotating about the aforementioned vertical rotation axis.

Preferably, each first gripping group is movable between said first operating position and said second operating position along the respective radial direction.

Preferably, the radial distance between the first operating position and the second operating position is greater than 20 cm.

Preferably, the radial distance between the first operating position and the second operating position is lower than 40 cm.

In preferred embodiments, the radial distance between the first operating position and the second operating position is between 20 cm and 40 cm, more preferably equal to 30 cm. The Applicant believes that this radial distance ensures that containers supported by adjacent gripping groups can be rotated by 180° without the risk of mutual interference, while at the same time limiting as much as possible the plan dimensions of the rotating device during use.

Preferably, the gripping groups are circumferentially equally spaced from each other. This expedient contributes to simplifying the operation of transferring automatically the containers to/from the gripping groups.

Preferably, each horizontal rotation axis extends along a respective radial direction. In this way the mutual spacing between circumferentially adjacent gripping groups is maximised.

Preferably, the rotation group is configured to allow, during its rotation about said vertical rotation axis, the rotation of said gripping groups about their respective horizontal rotation axes.

Preferably, the rotation group is configured to allow, during its rotation about said vertical rotation axis, the movement of each first gripping group between said first operating position and said second operating position.

Preferably, the rotation group is configured to allow the aforementioned movement of each first gripping group only before and after the rotation of the respective first gripping group about the respective horizontal rotation axis. This avoids the risk of interference between containers supported by circumferentially adjacent gripping groups during the rotation of such containers, even in the case of particularly long containers.

Preferably, the rotating device comprises a rotation angular sector wherein the gripping groups rotate about their respective horizontal rotation axes.

Preferably, the rotating device comprises a service angular sector wherein the gripping groups do not rotate about their respective horizontal rotation axes.

Preferably, the service angular sector comprises a feeding/pick-up angular sector wherein the first gripping groups are not moved between said first operating position and said second operating position. In this angular sector, the containers are transferred to the gripping groups (e.g. from a special feeding carousel) in a first orientation and subsequently transferred from the same gripping groups (e.g. to a pick-up carousel) in a second orientation, rotated by 180° with respect to the first orientation.

Preferably, the service angular sector comprises two translation angular sectors arranged on opposite sides with respect to said rotation angular sector and in which the first gripping groups are moved between said first operating position and said second operating position. In one of these translation angular sectors, the first gripping groups are moved from the first operating position to the second operating position, while in the other translation angular sector, the first gripping groups are moved from the second operating position to the first operating position.

Preferably, the service angular sector has an angular width greater than 180°, more preferably greater than or equal to 240°.

Preferably, the service angular sector has an angular width lower than 260°.

In preferred embodiments of the present disclosure, the service angular sector has an angular width between 180° and 260°, preferably between 240° and 260°, even more preferably equal to 255°.

Preferably, said plurality of gripping groups comprises second gripping groups that cannot be moved linearly.

Preferably, each first gripping group is circumferentially adjacent to a respective second gripping group. In this way, when the first gripping groups are in the second operating position, the two adjacent containers supported by adjacent gripping groups are arranged at different distances from the rotation group, further reducing the risk of mutual interference between the aforementioned containers during their 180° rotation, even in the case of particularly long containers.

In the present description and in the attached claims, the term "linearly movable" is used to indicate a movement between a position proximal to the rotation group and a position distal from the rotation group, such as that of the first gripping groups.

Preferably, the number of the first gripping groups is equal to the number of the second gripping groups.

Preferably, the rotating device further comprises a static support structure extending coaxially to said vertical rotation axis.

Preferably, the rotation group is mounted on said static support structure.

Preferably, the rotation group comprises a plurality of motion transmission groups.

Preferably, each motion transmission group is operationally interposed between the static support structure and a respective gripping group and is configured to move said respective gripping group about the respective horizontal rotation axis.

Preferably, each motion transmission group comprises a rotation shaft coaxial to the respective horizontal rotation axis.

Preferably, said rotation shaft is associated, at one radially outer end portion thereof, with a respective gripping group. The rotation of each gripping group therefore occurs due to the rotation of the respective rotation shaft about the respective horizontal rotation axis.

Preferably, each of the motion transmission groups configured to move the first gripping groups comprises a piston coaxially sliding along its respective horizontal rotation axis and associated with a respective rotation shaft. The movement of this piston therefore controls both the movement of the respective first gripping group between the first operating position and the second operating position and the 180° rotation of the gripping group.

Preferably, said rotation group comprises an outer casing.

Preferably, respective cross-roller bearings are fitted to the rotation shafts.

Preferably, each cross-roller bearing is interposed between a respective rotation shaft and the outer casing. Using the cross-roller bearings is particularly advantageous because, due to their small dimension, they allow for a coupling with relative motion at parts of the rotating device where spaces are extremely small, such as those between the rotation shaft and the outer casing, even more so where the aforementioned pistons are provided.

Preferably, the static support structure comprises a translation control annular cam arranged about said vertical rotation axis.

Preferably, each piston comprises a radially inner end portion slidably associated with said translation control annular cam. This cam is therefore functional for the movement of the pistons.

Preferably, each piston is rotatable about its respective horizontal rotation axis and is integrally associated with its respective rotation shaft. The rotation of the first gripping groups is therefore obtained by the rotation of the respective pistons about their respective horizontal rotation axes.

In preferred embodiments, both the linear movement of the first gripping groups and the rotation of these gripping groups is obtained by roto-translating actuators.

In the present description and the accompanying claims, the term "roto-translating actuator" is used to indicate a mechanical component configured to allow both a linear movement and a rotary movement.

In this case, preferably, the rotating device comprises a plurality of roto-translating actuators, each roto-translating actuator comprising a respective piston and a respective rotation shaft.

Preferably, each roto-translating actuator is defined by a "ball spline". The Applicant believes this type of actuator to be particularly suitable for allowing the linear movement of the first gripping groups and their rotation about their respective horizontal rotation axes with extremely low friction.

Preferably, such a translation control annular cam is arranged in an upper portion of the static support structure.

Preferably, said gripping groups are arranged below said translation control annular cam.

Preferably, said translation control annular cam is arranged inside said outer casing.

Preferably, the rotating device comprises a plurality of bearings slidingly coupled to said translation control annular cam, each of said bearings being integrally associated with the radially inner end portion of a respective piston. The sliding of the bearings with respect to the translation control annular cam causes the linear movement of the respective pistons.

Preferably, such a translation control annular cam comprises an annular body and a sliding guide recessed in the annular body.

Preferably, said bearings are slidingly housed within said sliding guide. Thus, there is no risk of losing the coupling between the piston and the translation control annular cam during the piston movement.

Preferably, said sliding guide has a profile that, at a first angular sector of the annular cam, is distal from said vertical rotation axis and, at a second angular sector of the annular cam, is proximal to said vertical rotation axis.

Preferably, the profile of the sliding guide is such that, at two intermediate angular sectors arranged on opposite sides with respect to said first angular sector and interposed between said first angular sector and said second angular sector, it progressively approaches said vertical rotation axis moving from the first angular sector towards the second angular sector.

Preferably, said second angular sector is arranged at the feeding/pick-up angular sector. When, during the rotation of the rotation group, the first gripping groups are at the second angular sector, they are in the first operating position and thus in a position circumferentially adjacent to the other gripping groups. In this operating position, the transfer of containers to/from the gripping groups can occur.

Preferably, said first angular sector is arranged at said rotation angular sector. When, during the rotation of the rotation group, the first gripping groups are at the first angular sector, they are in the second operating position and can rotate by 180° without running the risk that the containers supported by them may interfere with the containers supported by the circumferentially adjacent gripping groups.

Preferably, said two intermediate angular sectors are arranged at said two translation angular sectors. When, during the rotation of the rotation group, the first gripping groups are at one of these intermediate angular sectors, they are moved from the first operating position to the second operating position, whereas when the first gripping groups are at the other intermediate angular sector they are moved from the second operating position to the first operating position.

Preferably, said first angular sector has an angular width larger than that of the second angular sector.

Preferably, said static support structure comprises a driving shaft coaxial to said vertical rotation axis and configured to be controlled in rotation by a driving unit.

Preferably, said rotation group comprises a central shaft coaxial to said vertical rotation axis and coupled to said driving shaft.

Preferably, said central shaft is removably coupled to said driving shaft. The rotation group can thus be easily decoupled from the driving shaft to be replaced during a production changeover or for maintenance purposes.

Preferably, said central shaft is arranged above said driving shaft.

Preferably, the static support structure comprises a rotation control annular cam arranged about said vertical rotation axis. This cam is functional for the rotation of the gripping groups about their respective horizontal rotation axes.

Preferably, each motion transmission group comprises a drum coupled to said rotation control annular cam.

Preferably, the drum is rotatable about an axis parallel to the respective horizontal rotation axis.

Preferably, each motion transmission group further comprises a plurality of motion reduction gears.

Preferably, the motion reduction gears are interposed between said drum and the respective gripping group.

Preferably, said motion reduction gears define a reduction ratio of 3:1. Thus, a drum rotation of 540° corresponds to a gripping member rotation of 180°.

Preferably, said rotation control annular cam comprises a first annular body provided, at one of the angular portions thereof, with a plurality of first teeth and a first recess interposed between each pair of adjacent first teeth.

Preferably, said rotation control annular cam further comprises a second annular body arranged in a radially outer position with respect to said first annular body and provided, at an angular portion thereof, with a plurality of second teeth and with a second recess interposed between each pair of adjacent second teeth.

Preferably, said first annular body and second annular body are circumferentially offset so that each first tooth is not radially aligned to a second tooth.

Preferably, the drum comprises a plurality of equally spaced first bearings protruding from one face of said drum and coupled to said first annular body.

Preferably, the drum further comprises a plurality of angularly equally spaced second bearings protruding from the other face of said drum and coupled to said second annular body.

Preferably, the first bearings and second bearings are circumferentially offset so that each first bearing is not radially aligned to a second bearing.

Preferably, each first recess and second recess comprises a respective inlet wall configured to allow the bearing to enter in the recess and a respective outlet wall configured to allow the bearing to exit from the recess.

Preferably, when a first bearing is in contact with the inlet wall of each first recess, a second bearing is in contact with the outlet wall of each second recess.

This ensures an extremely precise and stable, i.e. clearance-free, coupling between the motion transmission group and the static support structure.

Preferably, the number of the first bearings is equal to the number of the first recesses.

Preferably, the number of the second bearings is equal to the number of the second recesses.

Preferably, said rotation control annular cam is arranged below said translation control annular cam.

Preferably, said gripping groups are arranged above said rotation control annular cam, and thus on the opposite side of the translation control annular cam. The static support structure thus comprises two physically distinct portions, one comprising the members provided for the linear movement of the gripping groups (these members preferably comprising the annular translation control cam) and another comprising the members provided for the rotation of the gripping groups about their respective horizontal rotation axes (these members preferably comprising the rotation control annular cam).

Preferably, said rotation control annular cam is arranged inside the outer casing of the rotation group.

Preferably, each gripping group comprises a plurality of gripping members, each gripping member being configured to support a respective container. This maximises the number of containers processed by the rotating device.

Preferably, said gripping members are removably associated with the respective gripping groups. This expedient provides the rotating device with a desired flexibility of operation. In fact, it is possible to vary the number and relative position of the gripping members in the gripping groups according to the circumstances, e.g. depending on the size of the containers.

Preferably, each gripping group comprises at least two gripping members, more preferably three gripping members.

Preferably, said rotating device comprises a number of gripping members comprised between 20 and 40, for example equal to 30.

Preferably, said gripping members comprise gripping pliers.

Preferably, the rotating device of the present disclosure comprises a number of gripping groups comprised between 5 and 15, for example 10 gripping groups.

These and other aspects are merely illustrative of the innumerable aspects associated with the present disclosure and should not be deemed as limiting in any manner. These and other aspects, features, and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figure 1:
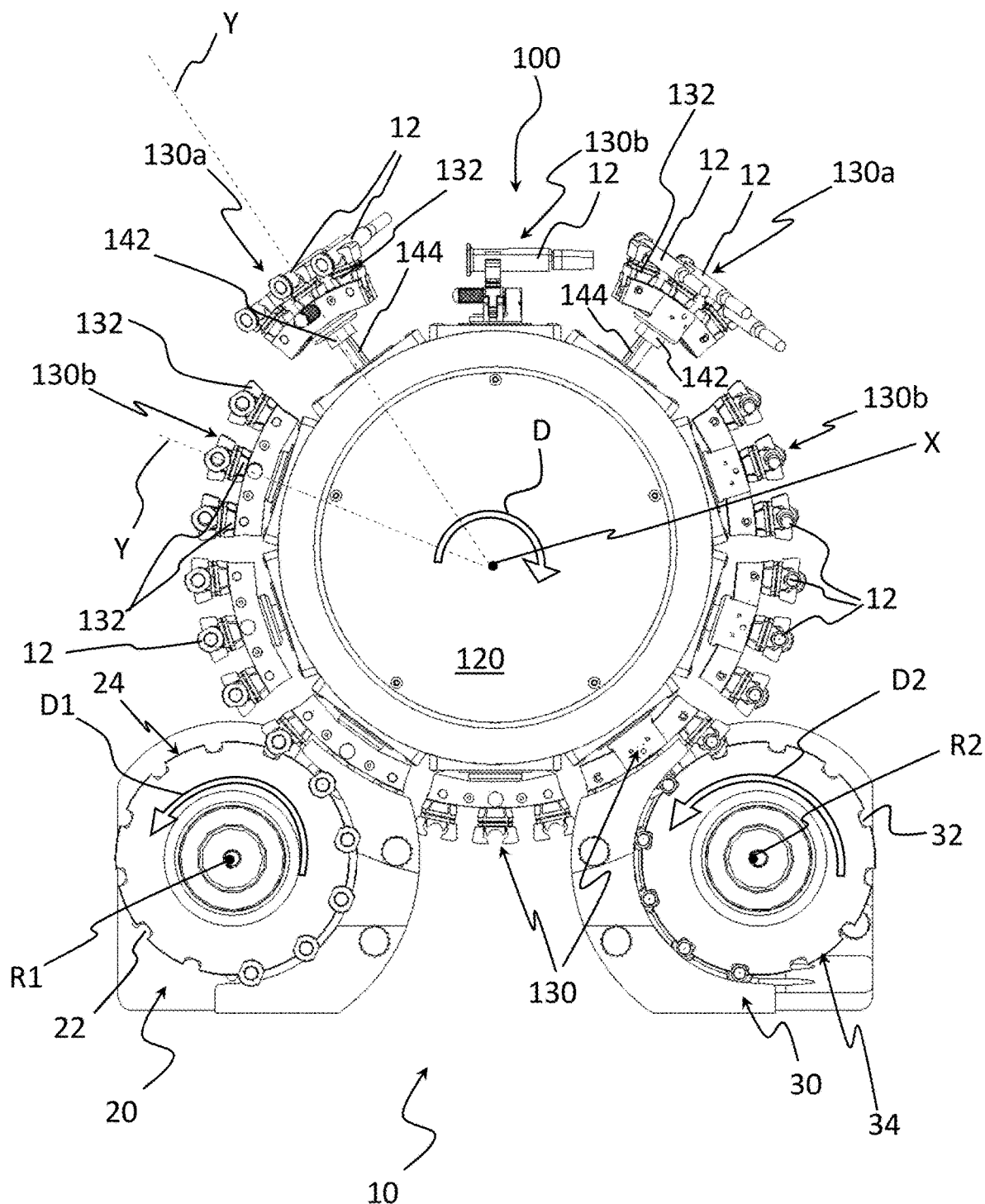
FIG. 1 is a schematic plan view from above of a portion of a packaging line for packaging container for pharmaceutical use including a rotating device in accordance with the present disclosure.

In FIG. 1, a portion of a packaging line for packaging primary containers for pharmaceutical use is collectively indicated with 10. In the specific case herein shown, the primary containers are pre-filled ready-to-use syringes 12.

The packaging line 10 comprises a rotating device 100 in accordance with the present disclosure, a feeding carousel 20 configured to feed syringes 12 to the rotating device 100, and a pick-up carousel 30 configured to pick-up syringes 12 from the rotating device 100.

The rotating device 100 is configured to: pick up syringes 12 from the feeding carousel 20, move them about a vertical rotation axis X in a direction D (which in FIG. 1 is clockwise), rotate them on themselves by 180° during the aforementioned movement and finally transfer them to the pick-up carousel 30.

Figure 4:
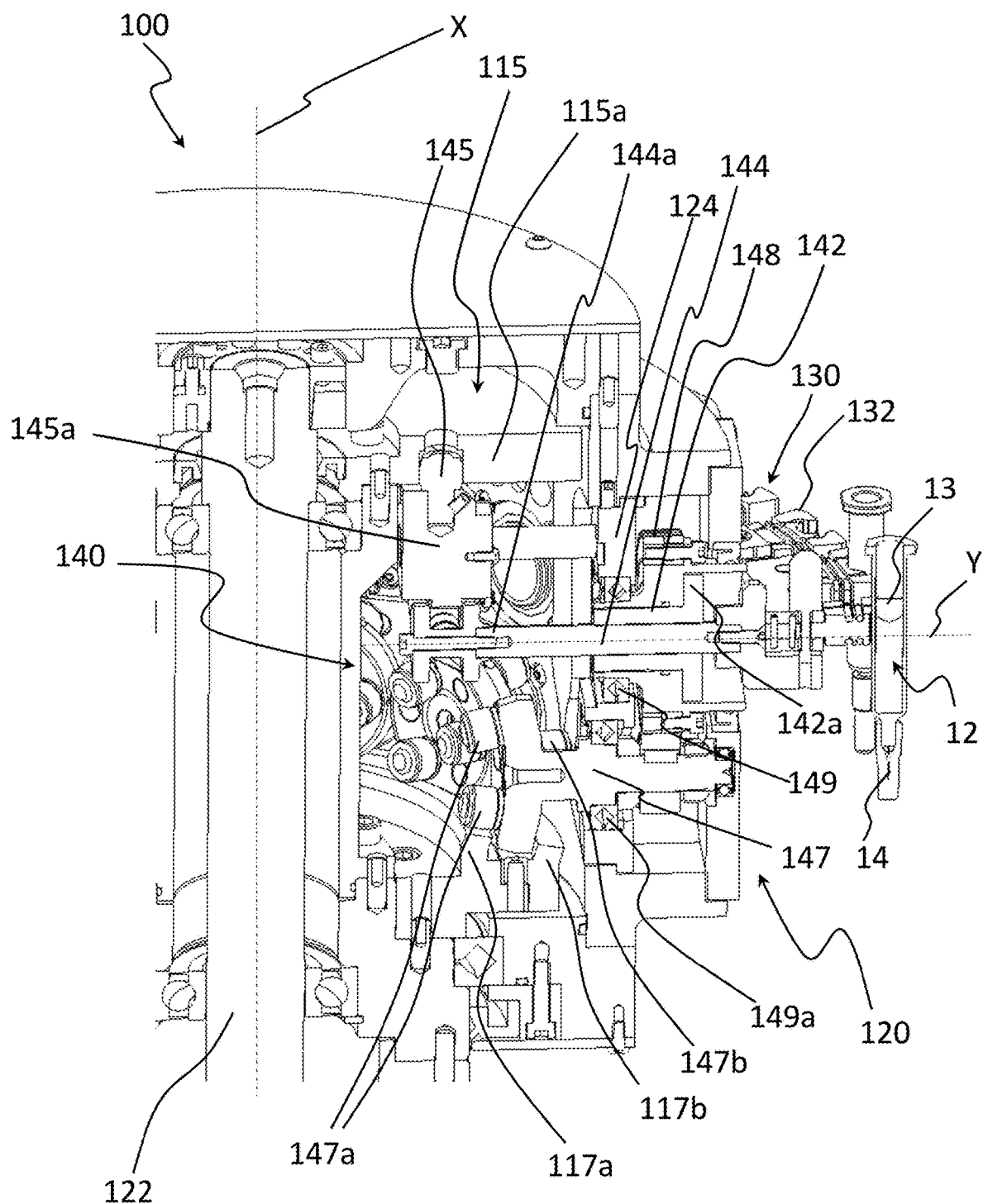
FIG. 4 is a schematic cutaway perspective view, in enlarged scale, of a portion of the rotating device of FIG. 1.

The feeding carousel 20 has a substantially cylindrical shape and is rotatable about a respective vertical rotation axis R1 (and thus parallel to the vertical rotation axis X) in a direction D1 (which in FIG. 1 is counter-clockwise). The feeding carousel 20 comprises a plurality of respective housing seats 22 arranged on a substantially cylindrical side surface thereof 24 equally spaced apart from each other, each of them being configured to house a syringe 12 in a vertical position with a first orientation. In this orientation, the plunger 13 of the syringe 12 is placed above the end of the syringe 12 on which the needle 14 is mounted (FIG. 4).

In the present description and in the appended claims, the terms "above" and "below", and similar terms such as "upper" and "lower" or "top" and "bottom", if any, are used with reference to the vertical rotation axis X of the rotating device 100 and to the position assumed by the rotating device 100 during its normal use.

The pick-up carousel 30 has a substantially cylindrical shape and is rotatable about a respective vertical rotation axis R2 (and thus parallel to the vertical rotation axis X and the rotation axis R1) in a direction D2 (which in FIG. 1 is counter-clockwise). The pick-up carousel 30 comprises a plurality of respective housing seats 32 arranged on a substantially cylindrical side surface thereof 34 equally spaced apart from each other, each of them being configured to house a syringe 12 in a vertical position with a second orientation. In this orientation, the syringe 12 is upside down with respect to the first orientation, i.e. the plunger 13 of the syringe 12 is placed below the end of the syringe 12 on which the needle 14 is mounted (FIG. 4). Therefore, when oriented according to the second orientation, the syringe 12 is rotated by 180° with respect to when it is oriented according to the first orientation.

Figure 3:
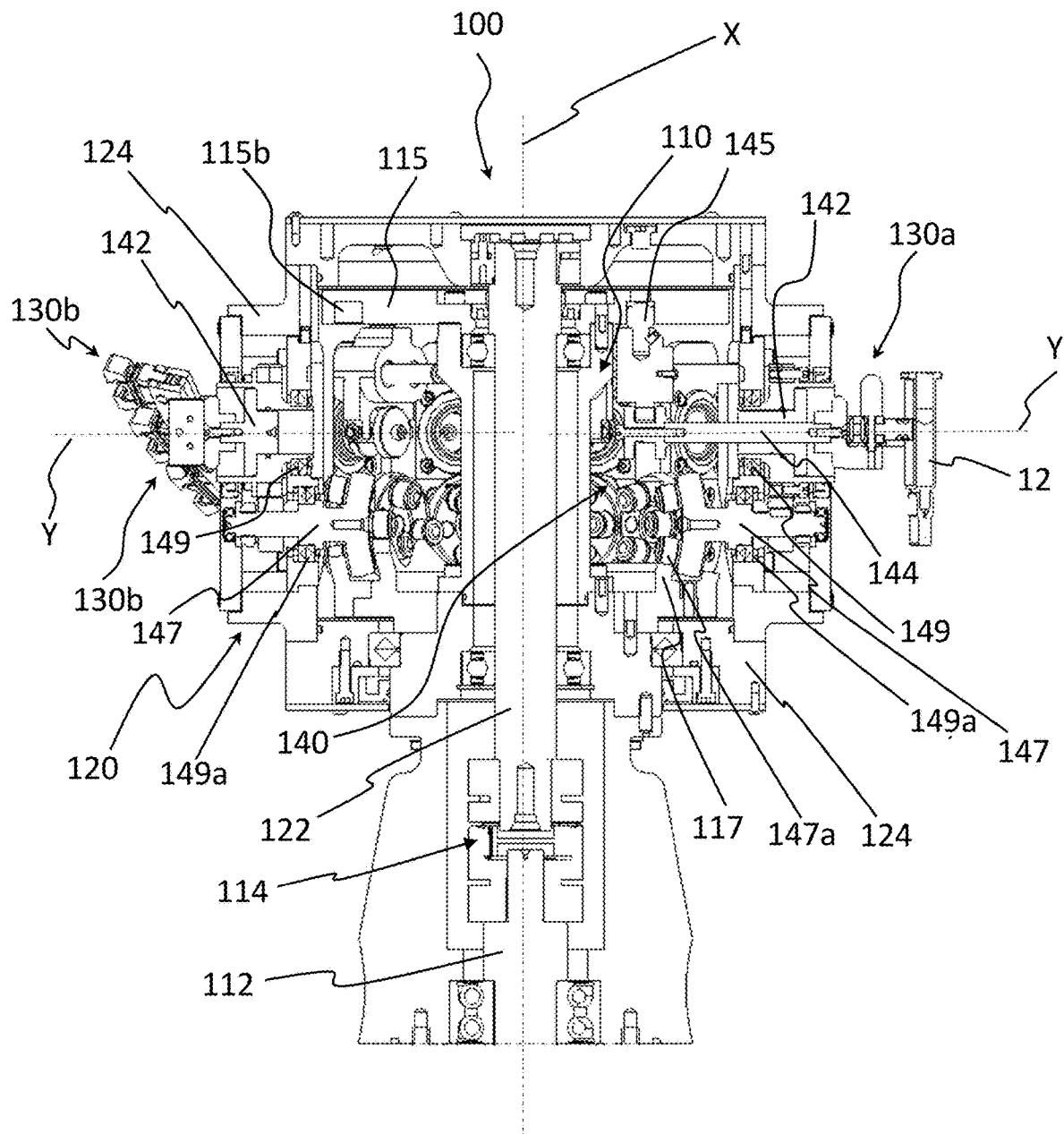
FIG. 3 is a schematic axial cross-section view of the rotating device of FIG. 1.

As better shown in FIG. 3, the rotating device 100 comprises a static support structure 110 extending coaxially to the vertical rotation axis X and a rotation group 120 rotatably mounted on the static support structure 110.

The rotation group 120 can be rotated about the vertical rotation axis X.

The static support structure 110 comprises a driving shaft 112 coaxial to the vertical rotation axis X and configured to be controlled in rotation by a driving unit (not shown).

The rotation group 120 comprises an outer casing 124 and a central shaft 122 which is coaxial to the vertical rotation axis X and is arranged above the driving shaft 112. The outer casing 124 is integral in rotation with the central shaft 122.

The central shaft 122 is removably coupled to the driving shaft 112 by a joint 114.

The rotation group 120 comprises a plurality of gripping groups 130, indicated with 130a and 130b, as discussed below.

The gripping groups 130 are arranged about the vertical rotation axis X along respective radial directions. In the non-limiting example shown in the figures, ten circumferentially equally spaced gripping groups 130 are provided.

Each gripping group 130 is configured to support one or more syringes 12 by respective gripping devices 132. In the non-limiting example shown in the figures, each gripping group 130 is configured to support three syringes 12 and therefore has three gripping members 132. Therefore, in the example herein shown, the number of gripping members 132 is 30.

The gripping members 132 are of the gripping plier type.

The gripping members 132 are removably coupled to the gripping groups 130, for example by snap coupling, so that the number and relative position of the gripping pliers 132 can be varied according to the size of the syringes 12.

For example, for syringes 12 provided with a flange diameter lower than 38 mm, a "single pitch" can be adopted, i.e. a distance between syringes 12 of approximately 40 mm, whereas for syringes 12 with a flange diameter greater than, or equal to, 38 mm, it is necessary to remove half of the gripping members 132 and adopt a "double pitch", with a distance between syringes 12 of 80 mm.

Each gripping group 130 is rotatable about a respective horizontal rotation axis Y, so as to rotate the syringes 12 by 180°. As shown in FIG. 1, each horizontal rotation axis Y extends along a respective radial direction.

Regardless of the pitch used, the angular speed of the rotation group 120 is such as to allow the syringes 12 to rotate by 180° within a time interval of between 1.2 s and 2 s, preferably equal to 1.5 s. This time interval is suitable to avoid bubbles to be formed in the liquid contained in the syringe 12.

The rotating device 100 is operatively connected to a control logic unit (not shown), which assigns an identifier to each syringe 12 and, after a 180° rotation of the syringes 12, communicates this identifier to a rejection unit (not shown), taking into account the rotation that has been made. For example, in a gripping group 130 with three syringes 12, the syringe 12 that is initially farthest to the right, will, after the 180° rotation of said gripping group 130, be on the left, and its identifier will therefore take precedence over the other two syringes 12 in the gripping group 130, for example in an optical scan phase downstream of the rotating device 100.

In the non-limiting example shown in the figures, the ten gripping groups 130 are of two types.

A first type of gripping groups 130 are herein referred to as first gripping groups 130a and a second type of gripping groups 130 are herein referred to as second gripping groups 130b.

The first gripping groups 130a are circumferentially alternated with the second gripping groups 130b. Therefore, each first gripping group 130a is circumferentially adjacent to a respective second gripping group 130b and vice versa.

The number of first gripping groups 130a is preferably the same as the number of second gripping groups 130b.

The first gripping groups 130a can be moved between a first operating position in which each first gripping group 130a is in a position proximal to the rotation group 120 and a second operating position in which the first gripping group 130a is in a position distal from the rotation group 120. In particular, each first gripping group 130a can be moved between the first operating position and the second operating position along the respective radial direction. In the first operating position the first gripping group 130a is in a retracted position and is adjacent to the outer casing 124, while in the second operating position the first gripping group 130a is in an extended position and is distal from the outer casing 124.

The radial distance between the first operating position and the second operating position is preferably between 20 cm and 40 cm, more preferably equal to 30 cm.

The second gripping groups 130b are not movable linearly. The second gripping groups 130b are adjacent to the outer casing 124, in a radial position that is substantially similar to that of the first gripping groups 130a when the latter are in their first operating position.

Thus, the second gripping groups 130b rotate by 180° while remaining adjacent to the outer casing 124, unlike the first gripping groups 130a, which instead can rotate by 180° when they are in a distal position with respect to the outer casing 124. Thus, two gripping groups 130a and 130b can rotate by 180° at the same time without the risk for the syringes 12 supported by them to interfere with each other.

The rotation of the first gripping group 130a and the second gripping group 130b about their respective horizontal rotation axes Y and the movement of each first gripping group 130a between the first operating position and the second operating position occurs during the rotation of the rotation group 120 about the vertical rotation axis X.

The movement of each first gripping group 130a between the first operating position and the second operating position occurs only before and after the rotation of the respective first gripping group 130a about the respective horizontal rotation axis Y.

Figure 2:
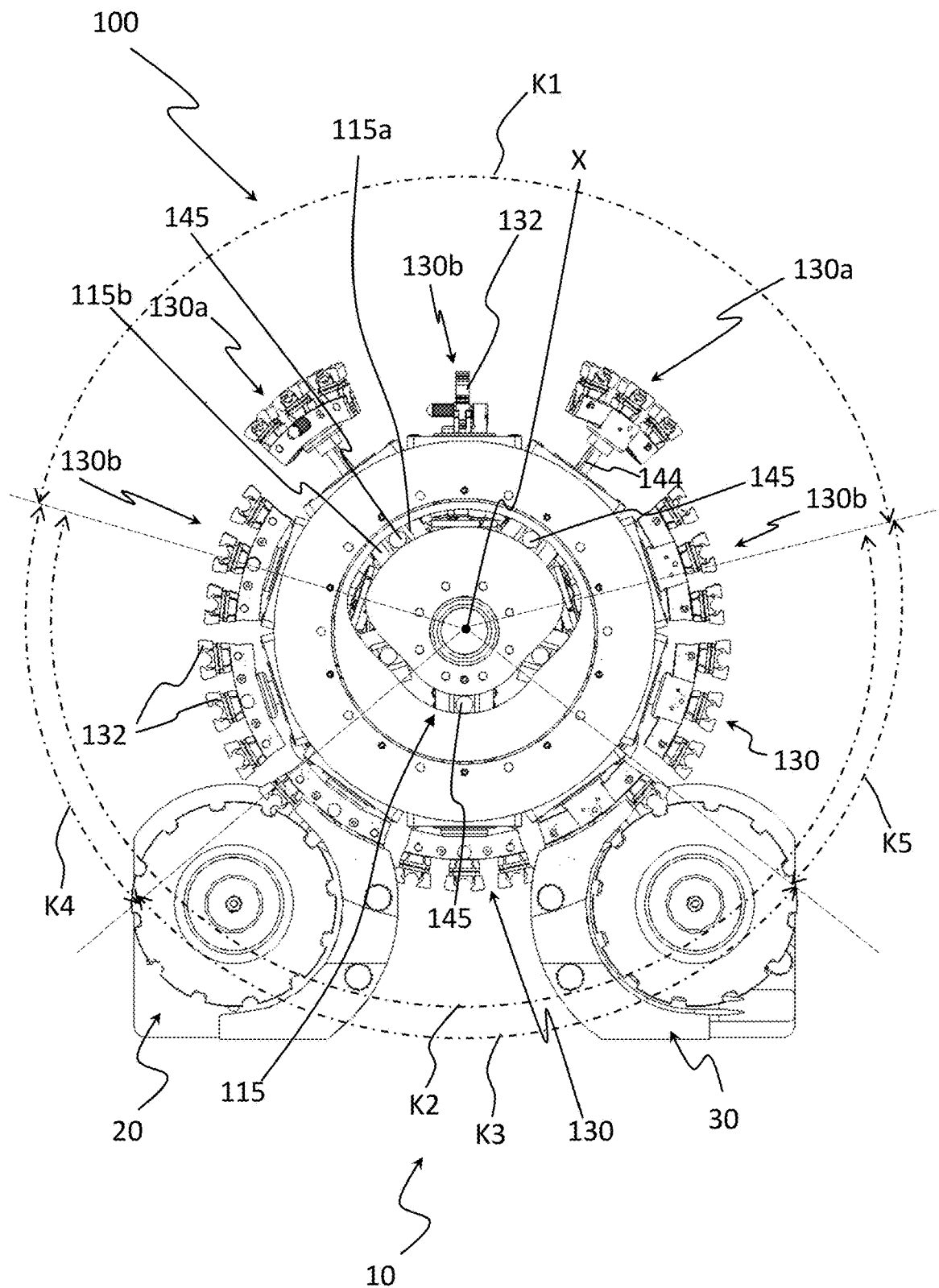
FIG. 2 is a schematic horizontal cross-section view of the portion of the packaging line of FIG. 1.

In particular, as shown in FIG. 2, the rotating device 100 comprises a rotation angular sector K1 in which the first and second gripping groups 130a and 130b rotate about their respective horizontal rotation axes Y and a service angular sector K2 in which the first and second gripping groups 130a and 130b do not rotate about their respective horizontal rotation axes Y.

The service angular sector K2 comprises, in turn, a feeding/pick-up angular sector K3 in which the first gripping groups 130a are not moved between the first operating position and the second operating position, and two translation angular sectors K4 and K5 arranged on opposite sides with respect to the feeding/pick-up angular sector K3 and in which the first gripping groups 130a are moved between the first operating position and the second operating position. Specifically, in the translation angular sector K4 the first gripping groups 130a are moved from the first operating position to the second operating position, while in the translation angular sector K5 the first gripping groups 130a are moved from the second operating position to the first operating position.

Preferably, the rotation angular sector K1 has an angular width between 100° and 180°, more preferably between 100° and 120°, even more preferably equal to 105°.

Preferably, the service angular sector K2 has an angular width between 180° and 260°, more preferably between 240° and 260°, even more preferably equal to 255°.

Preferably, the feeding/pick-up angular sector K3 has an angular width between 180° and 260°, more preferably between 240° and 260°, even more preferably equal to 255°.

Preferably, the translation angular sectors K4 and K5 have the same angular width. Preferably, this angular width is between 45° and 90°, more preferably between 50° and 70°, even more preferably between 55° and 65°.

Figure 5:
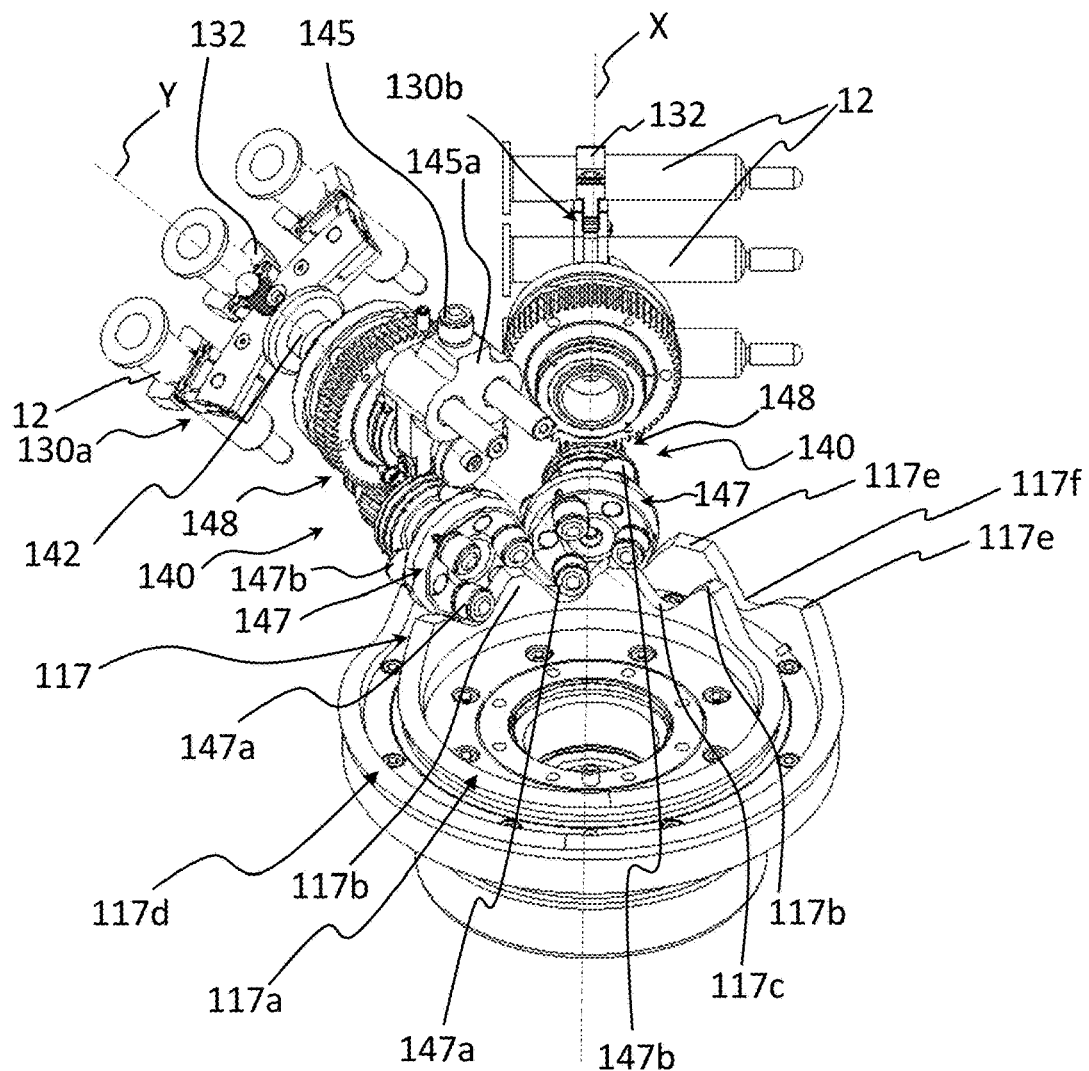
FIG. 5 is a schematic perspective view in enlarged scale of a portion of the rotating device of FIG. 1.

As shown in FIGS. 3-5, the rotation group 120 comprises a plurality of motion transmission groups 140, each of them being operationally interposed between the static support structure 110 and a respective gripping group 130.

Each motion transmission group 140 is configured to move the respective gripping group 130 about its respective horizontal rotation axis Y, so that the syringes 12 are rotated by 180°.

Each motion transmission group 140 comprises a rotation shaft 142 coaxial to the respective horizontal rotation axis Y. Each rotation shaft 142 is associated, at a radially outer end portion 142a thereof, with a respective gripping group 130.

Furthermore, as shown in FIGS. 3 and 4, each motion transmission groups 140 configured to move the first gripping groups 130a comprises a piston 144 coaxially sliding along the respective horizontal rotation axis Y and integrally associated with a respective rotation shaft 142. The movement of the piston 144 along the horizontal rotation axis Y causes the translation of the respective gripping group 130a between the first operating position and the second operating position. Each piston 144 is rotatable about the respective horizontal rotation axis Y, so that the rotation of the piston 144 results in a rotation of 180° of the syringes 12 associated with the gripping groups 130a. The assembly comprising the piston 144 and the respective rotation shaft 142 defines a roto-translating actuator. In a preferred embodiment of the rotating device 100 of the present disclosure, each roto-translating actuator is defined by a respective ball spline.

As shown in FIGS. 2 and 3, the static support structure 110 comprises a translation control annular cam 115 which is arranged inside the outer casing 124, about the vertical rotation axis X.

As shown in FIG. 4, the translation control annular cam 115 is arranged in an upper portion of the static support structure 110, and the first and second gripping groups 130a and 130b are arranged below the translation control annular cam 115.

Still with reference to FIG. 4, each piston 144 comprises a radially inner end portion 144a which is slidingly associated with the translation control annular cam 115 via a block 145a supporting a respective bearing 145, also shown in FIG. 5. In particular, the bearing 145 is integrally associated with the block 145a, which in turn is integrally associated with the radially inner end portion 144a of the piston 144. The bearing 145 is slidingly coupled to the translation control annular cam 115. The sliding of the bearing 145 with respect to the translation control annular cam 115 causes the linear movement of the piston 144 and thus the linear movement of the gripping groups 130a between the first operating position and the second operating position.

In detail, as shown in FIGS. 2 and 3, the translation control annular cam 115 comprises an annular body 115a and a sliding guide 115b recessed in the annular body 115a. The bearings 145 are slidingly housed within the sliding guide 115b.

Referring to FIG. 2, the sliding guide 115b has a profile such that, at a first angular sector of the translation control annular cam 115 which is arranged at the angular rotation sector K1 and which has an angular width equal to that of the latter, it is distal from the vertical rotation axis X. When the bearings 145 are in the first angular sector, the first gripping groups 130a are in the second operating position.

The profile of the sliding guide 115b is such that, at a second angular sector of the translation control annular cam 115 which is arranged at the feeding/pick-up angular sector K3 and which has an angular width equal to that of the latter, it is proximal to the vertical rotation axis X. When the bearings 145 are in the second angular sector, the first gripping groups 130a are in the first operating position.

The first angular sector has an angular width greater than that the second angular sector.

At two intermediate angular sectors arranged on opposite sides with respect to the first angular sector and interposed between the aforementioned first angular sector and the aforementioned second angular sector, the profile of the sliding guide 115b progressively approaches the vertical rotation axis X moving from the first angular sector towards the second angular sector. These two intermediate angular sectors are arranged at the two translation angular sectors K4 and K5 and have the same angular width as the latter. When the bearings 145 are in the two intermediate angular sectors, the first gripping groups 130a move from the first operating position to the second operating position and from the second operating position to the first operating position, respectively.

As shown in FIG. 5, the static support structure 110 also comprises a rotation control annular cam 117 arranged inside the outer casing 124, about the vertical rotation axis X and below the translation control annular cam 115.

The rotation control annular cam 117 comprises a first annular body 117a and a second annular body 117d arranged in a radially outer position with respect to the first annular body 117a. The first annular body 117a and the second annular body 117d are concentric to the vertical rotation axis X.

The first annular body 117a is provided, at an angular portion thereof, with a plurality of first teeth 117b and first recesses 117c, each first recess 117c being interposed between each pair of adjacent first teeth 117b.

The second annular body 117d is provided, at an angular portion thereof, with a plurality of second teeth 117e and second recesses 117f, each second recess 117f being interposed between each pair of adjacent second teeth 117e.

The first annular body 117a and the second annular body 117d are circumferentially offset so that each first tooth 117b is not radially aligned to a second tooth 117e and each first recess 117c is not radially aligned to a second recess 117f.

Each motion transmission group 140 comprises a drum 147 coupled to the rotation control annular cam 117.

The drum 147 is rotatable about an axis parallel to the respective horizontal rotation axis Y.

The drum 147 comprises a plurality of angularly equally spaced first bearings 147a protruding from one face of the drum 147 and a plurality of angularly equally spaced second bearings 147b protruding from the other face of the drum 147.

The first bearings 147a are coupled to the first annular body 117a and the second bearings 147b are coupled to the second annular body 117d.

The first bearings 147a and the second bearings 147b are circumferentially offset so that each first bearing 147a is not radially aligned to a second bearing 147b.

The number of the first bearings 147a is equal to the number of the first recesses 117c and the number of the second bearings 147b is equal to the number of the second recesses 117f. In the non-limiting example of the figures, the number of the first bearings 147a is equal to the number of the second bearings 147b. In particular, three first bearings 147a and three second bearings 147b are provided.

Each motion transmission group 140 further comprises a plurality of motion reduction gears 148 interposed between the drum 147 and the respective gripping group 130. Preferably, the motion reduction gears 148 define a reduction ratio of 3:1.

Figure 6:
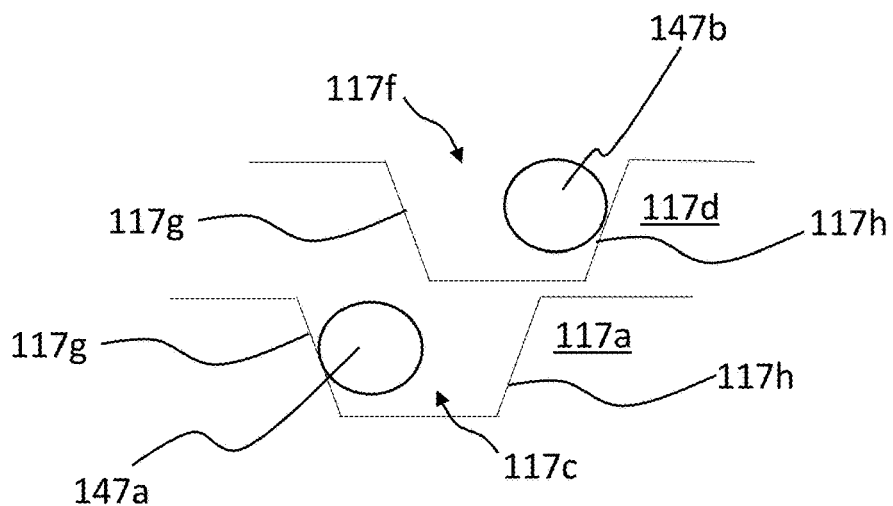
FIG. 6 is a very schematic perspective view of some of the components shown in FIG. 5.

As shown in FIG. 6, each first recess 117c and each second recess 117f comprises a respective inlet wall 117g configured to allow the bearing to enter in the recess and a respective outlet wall 117h configured to allow the bearing to exit from the recess. Preferably, the inlet walls 117g and outlet walls 117h are subjected to a surface grinding processing to precisely define the shape and size of the respective recesses 117c, 117f.

When a first bearing 147a is in contact with the inlet wall 117g of each first recess 117c, a second bearing 147b is in contact with the outlet wall 117h of each second recess 117f.

The Applicant found that the first and second bearings 147a and 147b, insisting on the inlet and outlet walls 117g and 117h of the first and second annular bodies 117a and 117d, could locally overheat the rotation control annular cam 117. To avoid such overheating, the motion transmission groups 140 are preferably immersed in grease, preferably food grade, so as not to compromise the sterility of the production environment in the event of grease leakage. Grease is also beneficial for the motion transmission gears 148. To properly contain the grease within the outer casing 124 the rotation group 120 comprises a plurality of sealing gaskets (not shown). For example, such sealing gaskets are arranged between the rotation group 120 and the static support structure 110, in particular at the central shaft 122 and at the outer casing 124.

Respective cross-roller bearings 149 are fitted on the rotation shafts 142 at the outer casing 124 (FIGS. 3 and 4).

In the non-limiting example of FIGS. 3 and 4, respective cross-roller bearings 149a are also fitted on the drums 147 at the outer casing 124.

Obviously, in order to meet specific and contingent requirements, a person skilled in the art may make several changes to the above-described embodiments, all of which being within the scope of protection defined by the following claims.

In a possible alternative embodiment (not shown) of the present disclosure, in the two translation angular sectors K4 and K5, the first gripping groups 130a not only move between the first operating position and the second operating position, but also rotate about their respective horizontal rotation axes Y.

In a further possible alternative embodiment (not shown) of the present disclosure, all the gripping groups 130 are movable between a first operating position and a second operating position, i.e. all the gripping groups 130 are analogous to the first gripping groups 130a described above. This solution is however advantageous compared to the prior art, as in the second operating position the adjacent syringes 12 of adjacent gripping groups 130 are sufficiently spaced apart from each other.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

What is claimed is:

1. A rotating device for moving containers for pharmaceutical use, comprising:

a rotation group configured to be controlled in rotation about a vertical rotation axis;

a plurality of gripping groups associated with said rotation group and arranged about said vertical rotation axis, each gripping group being configured to support at least one of said containers and being rotatable about a respective horizontal rotation axis;

wherein at least some first gripping groups of said plurality of gripping groups are movable between a first operating position in which each first gripping group is in a position proximal to said rotation group and a second operating position in which said first gripping group is in a position distal from said rotation group.

2. The rotating device according to claim 1, wherein said gripping groups are arranged about said vertical rotation axis along respective radial directions and each first gripping group is movable between said first operating position and said second operating position along the respective radial direction.

3. The rotating device according to claim 1, wherein said rotation group is configured to allow, during the rotation of said rotation group about said vertical rotation axis, both the rotation of said gripping groups about the respective horizontal rotation axes and the movement of each first gripping group between said first operating position and said second operating position.

4. The rotating device according to claim 1, wherein said rotation group is configured to allow the movement of each first gripping group between said first operating position and said second operating position only before and after the rotation of the respective first gripping group about the respective horizontal rotation axis.

5. The rotating device according to claim 1, wherein said plurality of gripping groups comprises second gripping groups which are not linearly movable, wherein each first gripping group is circumferentially adjacent to a respective second gripping group.

6. The rotating device according to claim 1, further comprising:

a static support structure extending coaxially to said vertical rotation axis;

wherein said rotation group comprises:

a plurality of motion transmission groups, each motion transmission group being operatively interposed between said static support structure and a respective gripping group and being configured to move said respective gripping group about the respective horizontal rotation axis.

7. The rotating device according to claim 6, wherein:

each motion transmission group comprises a rotation shaft coaxial to the respective horizontal rotation axis and associated, at a radially outer end portion thereof, with a respective gripping group;

each of the motion transmission groups configured to move the first gripping groups comprises a piston coaxially sliding along the respective horizontal rotation axis and associated with a respective rotation shaft.

8. The rotating device according to claim 7, wherein the static support structure comprises a translation control annular cam arranged about said vertical rotation axis and wherein each piston comprises a radially inner end portion slidingly associated with said translation control annular cam.

9. The rotating device according to claim 6, wherein the static support structure comprises a rotation control annular cam arranged about said vertical rotation axis.

10. The rotating device according to claim 9, wherein each motion transmission group comprises:

a drum coupled to said rotation control annular cam and rotatable about an axis parallel to the respective horizontal rotation axis;

a plurality of motion reduction gears interposed between said drum and the respective gripping group.

11. The rotating device according to claim 9, wherein said rotation control annular cam comprises:

a first annular body having, at an angular portion thereof, a plurality of first teeth and a first recess interposed between each pair of adjacent first teeth;

a second annular body arranged in a radially outer position with respect to said first annular body and having, at an angular portion thereof, a plurality of second teeth and a second recess interposed between each pair of adjacent second teeth;

wherein said first annular body and second annular body are circumferentially offset so that each first tooth is not aligned in a radial direction with a second tooth.

12. The rotating device according to claim 11, wherein the drum comprises:

a plurality of angularly equally spaced first bearings which protrude from a face of said drum and are coupled to said first annular body;

a plurality of angularly equally spaced second bearings which protrude from the other face of said drum and are coupled to said second annular body, wherein the first bearings and the second bearings are circumferentially offset so that each first bearing is not aligned in a radial direction with a second bearing.

13. The rotating device according to claim 12, wherein each first recess and second recess comprises a respective inlet wall configured to allow the bearing to enter in the recess and a respective outlet wall configured to allow the bearing to exit from the recess, wherein when a first bearing is in contact with the inlet wall of each first recess a second bearing is in contact with the outlet wall of each second recess.

14. The rotating device according to claim 1, wherein each gripping group comprises a plurality of gripping members, each gripping member being configured to support a respective container.

15. The rotating device according to claim 10, wherein said rotation control annular cam comprises:

a first annular body having, at an angular portion thereof, a plurality of first teeth and a first recess interposed between each pair of adjacent first teeth;

a second annular body arranged in a radially outer position with respect to said first annular body and having, at an angular portion thereof, a plurality of second teeth and a second recess interposed between each pair of adjacent second teeth;

wherein said first annular body and second annular body are circumferentially offset so that each first tooth is not aligned in a radial direction with a second tooth.

16. The rotating device according to claim 15, wherein the drum comprises:

a plurality of angularly equally spaced first bearings which protrude from a face of said drum and are coupled to said first annular body;

a plurality of angularly equally spaced second bearings which protrude from the other face of said drum and are coupled to said second annular body, wherein the first bearings and the second bearings are circumferentially offset so that each first bearing is not aligned in a radial direction with a second bearing.

17. The rotating device according to claim 16, wherein each first recess and second recess comprises a respective inlet wall configured to allow the bearing to enter in the recess and a respective outlet wall configured to allow the bearing to exit from the recess, wherein when a first bearing is in contact with the inlet wall of each first recess a second bearing is in contact with the outlet wall of each second recess.

* * * * *